US012716579B2

(12) United States Patent
Fukumura et al.

(10) Patent No.: US 12,716,579 B2
(45) Date of Patent: Aug. 25, 2026

(54) LED LIGHT SOURCE DEVICE AND BIOCHEMICAL ANALYSIS DEVICE

(71) Applicant: HITACHI HIGH-TECH CORPORATION, Tokyo (JP)

(72) Inventors: Mami Fukumura, Tokyo (JP); Tetsuji Kawahara, Tokyo (JP); Takuya Takahashi, Tokyo (JP); Hiroshi Horikawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 18/857,879

(22) PCT Filed: Mar. 15, 2023

(86) PCT No.: PCT/JP2023/009998
§ 371 (c)(1),
(2) Date: Oct. 18, 2024

(87) PCT Pub. No.: WO2023/223648
PCT Pub. Date: Nov. 23, 2023

(65) Prior Publication Data

US 2025/0277581 A1 Sep. 4, 2025

(30) Foreign Application Priority Data

May 16, 2022 (JP) ................................. 2022-080025

(51) Int. Cl.
*F21V 29/56* (2015.01)
*F21V 29/503* (2015.01)
*G01N 21/31* (2006.01)

(52) U.S. Cl.
CPC ............ *F21V 29/56* (2015.01); *F21V 29/503* (2015.01); *G01N 21/31* (2013.01); *G01N 2201/062* (2013.01)

(58) Field of Classification Search
CPC ....... F21V 29/56; F21V 29/503; G01N 21/31; G01N 2201/062; G01N 21/255;
(Continued)

(56) References Cited

U.S. PATENT DOCUMENTS 8,064,062 B2 * 11/2011 Ogawa ................. G01N 21/253
356/432
8,675,187 B2 * 3/2014 Harada ..................... G01J 3/02
356/213

(Continued)

FOREIGN PATENT DOCUMENTS

EP 4 350 787 A1 4/2024
JP 2017-505139 A 2/2017

(Continued)

OTHER PUBLICATIONS

International Search Report of PCT/JP2023/009998 dated Jun. 6, 2023.

(Continued)

*Primary Examiner* — Steven S Paik
*Assistant Examiner* — Asifa Habib
(74) *Attorney, Agent, or Firm* — MATTINGLY & MALUR, PC

(57) ABSTRACT

A biochemical analysis device that emits light used to measure absorbance of a sample includes an LED that emits the light, a substrate on which the LED is mounted, a spacer that supports the substrate, a holder that accommodates the LED, the substrate, and the spacer, and a flow path formed by circulating constant temperature water through the holder. The spacer is formed of a material having a heat conductivity higher than that of the holder. The spacer is in contact with the holder at a contact portion. A convex portion of the spacer is covered with a concave portion of the holder through an air layer.

16 Claims, 11 Drawing Sheets

(58) Field of Classification Search
CPC ............ G01N 2201/0231; G01N 21/78; G01J 3/0286; G01J 3/10
See application file for complete search history.

(56) References Cited

U.S. PATENT DOCUMENTS

| | | | | |
|---|---|---|---|---|
| 10,274,487 | B2 * | 4/2019 | Ludwig | G01N 33/54373 |
| 2002/0149312 | A1 * | 10/2002 | Roberts | F21V 29/54 257/E23.087 |
| 2004/0119975 | A1 | 6/2004 | Ostler et al. | |
| 2006/0121602 | A1 * | 6/2006 | Hoshizaki | F21V 29/763 422/63 |
| 2008/0218733 | A1 * | 9/2008 | Benes | G01N 21/3577 356/51 |
| 2011/0255090 | A1 * | 10/2011 | Harada | G01N 21/0332 356/432 |
| 2013/0217598 | A1 * | 8/2013 | Ludwig | G01N 33/54373 422/68.1 |
| 2013/0301051 | A1 * | 11/2013 | Pogosyan | G01J 1/08 250/578.1 |
| 2014/0233233 | A1 * | 8/2014 | Park | F21V 29/773 362/249.02 |
| 2015/0185242 | A1 * | 7/2015 | Mimura | G01N 21/59 422/64 |
| 2015/0362476 | A1 | 12/2015 | Clements et al. | |
| 2016/0334843 | A1 | 11/2016 | Uto et al. | |
| 2017/0113225 | A1 * | 4/2017 | Howell | B01L 7/52 |
| 2019/0060897 | A1 * | 2/2019 | Makino | G01N 21/64 |
| 2019/0257829 | A1 * | 8/2019 | Ludwig | G01N 33/54373 |
| 2019/0316963 | A1 | 10/2019 | Ishida et al. | |
| 2020/0240716 | A1 | 7/2020 | Watanabe | |
| 2021/0041472 | A1 * | 2/2021 | Limbach | G01N 21/59 |
| 2021/0381954 | A1 * | 12/2021 | Kawamura | G01N 21/255 |
| 2025/0347617 | A1 * | 11/2025 | Kim | G01N 21/255 |

FOREIGN PATENT DOCUMENTS

| | | |
|---|---|---|
| JP | 2020-087974 A | 6/2020 |
| JP | 2020-118403 A | 8/2020 |
| WO | 2015/099096 A1 | 7/2015 |

OTHER PUBLICATIONS

Extended European Search Report received in corresponding European Application No. 23807264.9 dated Apr. 8, 2026.

* cited by examiner

A-SIDE VIEW

A-SIDE VIEW

LED LIGHT SOURCE DEVICE AND BIOCHEMICAL ANALYSIS DEVICE

TECHNICAL FIELD

The present invention relates to an LED light source device and a biochemical analysis device.

BACKGROUND ART

PTL 1 discloses a biochemical analysis device using an LED light source instead of using a tungsten lamp having a short lamp life as a light source. PTL 1 discloses that "The housing is a mechanism that supports the LED substrate and the light pipe. The housing may be made of plastic or metal. Preferably, when formed of a metal having high heat conductivity, for example, aluminum, it can be used as a path for dissipating heat of the LED substrate.". This literature also describes that "A heat sink may be provided because the LED module, particularly the LED element, generates heat around it. In addition, a cooling mechanism using water cooling or air cooling may be provided on the opposite side of the heat sink to the LED module.". Further, it is also described that "The efficiency with which the phosphor absorbs light having a near-ultraviolet wavelength to a blue light wavelength and emits light tends to decrease when the temperature of the phosphor increases. Therefore, as described above, the light source is desirably provided with a cooling mechanism.".

CITATION LIST

Patent Literature

PTL 1: JP 2020-87974 A

SUMMARY OF INVENTION

Technical Problem

The LED module of the biochemical analysis device described in PTL 1 includes two components, namely a housing formed of a metal having high heat conductivity such as aluminum, and a cooling mechanism using water cooling or air cooling on the opposite side of the heat sink to the LED module. Having the two components makes it possible to shorten the time required to stabilize the light amount of the LED light source after the power is turned on and improve the analysis throughput. On the other hand, when the LED module is installed in an environment where temperature fluctuation is large, there is a problem that the temperature of the LED module also fluctuates and the luminance efficiency of the LED finally fluctuates.

An object of the present invention is to provide a biochemical analysis device that achieves both the requirement to shorten the time required to stabilize the light amount of an LED light source after the power is turned on and the requirement to suppress the temperature fluctuation of an LED module installed under an environment where temperature fluctuation is large to suppress fluctuation of luminance efficiency of an LED.

Solution to Problem

In order to solve the above problems, one of the representative biochemical analysis devices according to the present invention is achieved by including an LED that emits the light, a substrate on which the LED is mounted, a spacer that supports the substrate, a housing (hereinafter, holder) that accommodates the LED, the substrate, and the spacer, and a flow path formed by circulating water through the holder, wherein the spacer is formed of a material having a heat conductivity higher than that of the holder, the spacer is in contact with the holder at a contact portion, and a convex portion of the spacer is covered with a concave portion of the holder through an air layer.

In order to solve the above problems, one of the representative LED light source devices according to the present invention is an LED light source device that emits light used to measure absorbance of a sample and includes an LED that emits the light, a substrate on which the LED is mounted, a spacer that supports the substrate, and a holder that accommodates the LED, the substrate, and the spacer, wherein the spacer is formed of a material having a heat conductivity higher than that of the holder, the spacer is in contact with the holder at a contact portion, and a convex portion of the spacer is covered with a concave portion of the holder through an air layer.

Advantageous Effects of Invention

According to the present invention, since the spacer is formed of a material having a low heat conductivity and the spacer and the holder are in contact with each other, the time required for the light amount of the LED light source to be stabilized can be shortened.

In addition, by covering the convex portion of the spacer with the concave portion of the holder, the exposed area of the spacer to the outside air is reduced, and by forming the air layer between the concave portion of the holder and the convex portion of the spacer, the thermal resistance is increased, and the temperature fluctuation of the LED module installed in an environment where the temperature fluctuation is large can be suppressed, thereby suppressing the fluctuation of the luminance efficiency of the LED.

Problems, configurations, and effects other than those described above will be clarified by the following description of embodiments.

DESCRIPTION OF EMBODIMENTS

Hereinafter, embodiments of the present invention will be described with reference to the accompanying drawings.

First Embodiment

Figure 1:
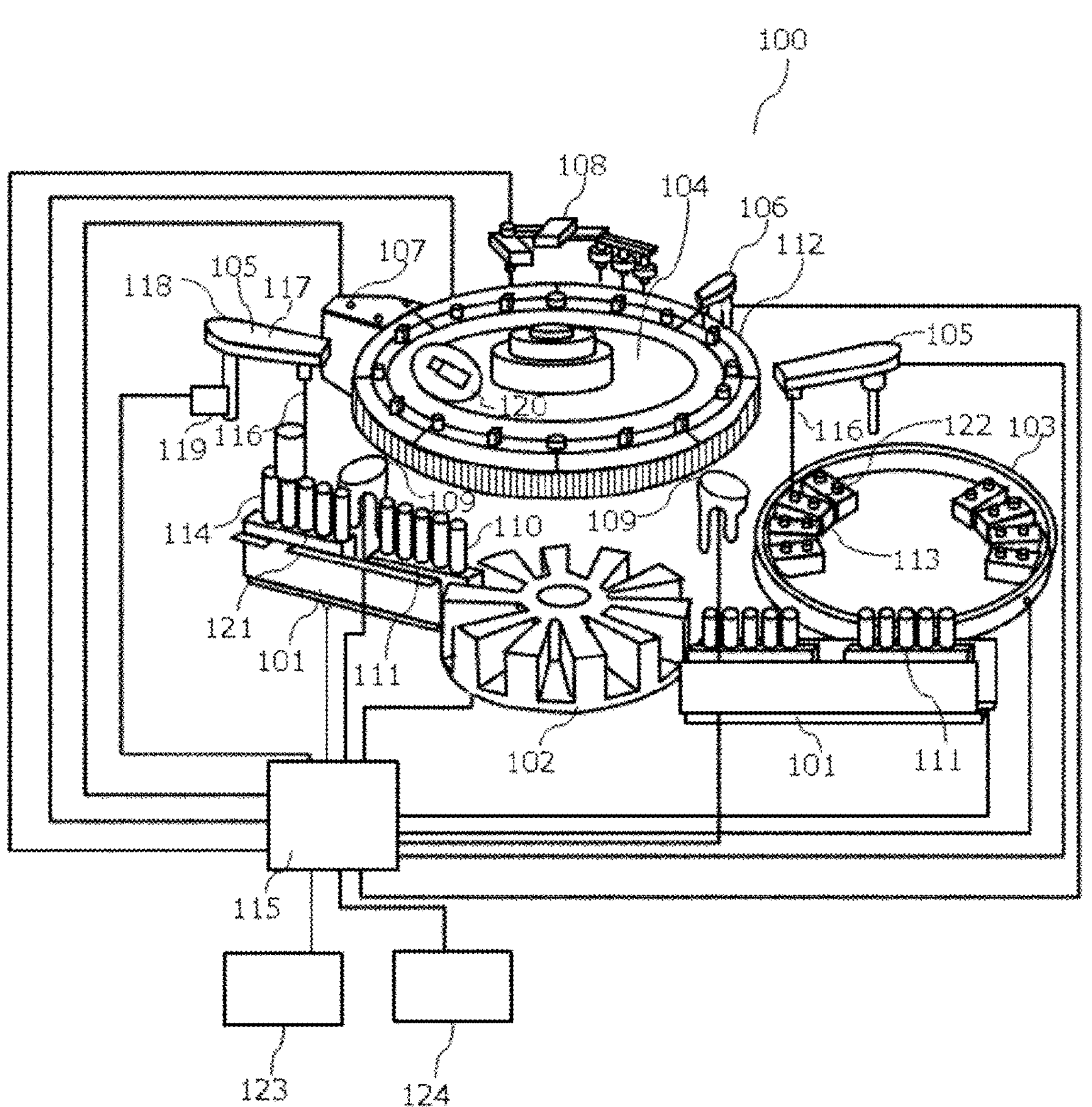
FIG. 1 is a view showing the overall configuration of a biochemical analysis device to which the present invention is applied.
Figure 2:
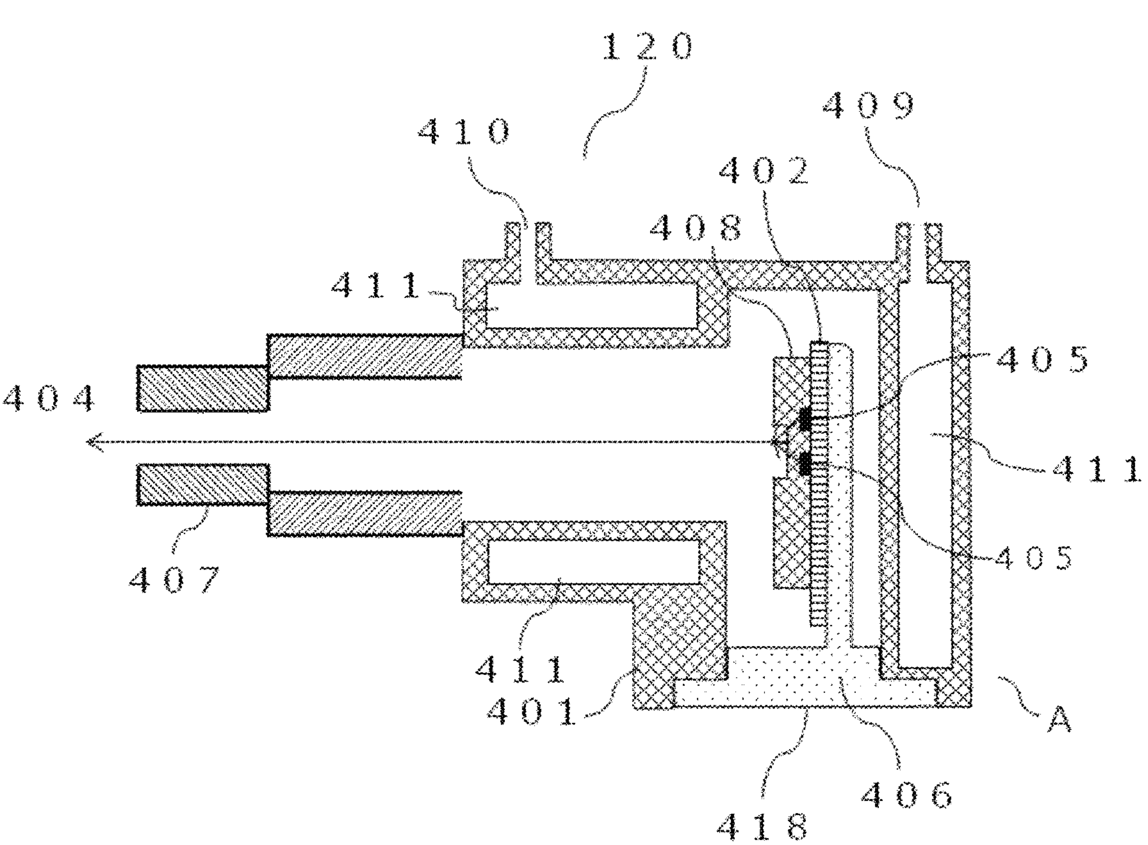
FIG. 2 is a sectional view for explaining the configuration of an LED unit according to the first embodiment.

Hereinafter, an embodiment of the present invention will be described with reference to FIGS. 1 and 2. First, the overall configuration of a biochemical analysis device 100 according to the present embodiment will be described with reference to FIG. 1. FIG. 1 is a diagram showing the overall configuration of the biochemical analysis device 100 according to the first embodiment.

<Configuration of Biochemical Analysis Device>

The biochemical analysis device 100 includes a conveyance line 101, a rotor 102, a reagent disk 103, a reaction disk 104, a pipetting device 105, a mixing device 106, a spectrometer 107, a reaction cell washing device 108, a nozzle washing device 109, a control unit 115, an input unit 123, a display unit 124, and the like.

The conveyance line 101 transfers a specimen rack 111 holding a specimen container 110 containing a specimen to a specimen pipetting position 121 by a required amount. The pipetting device 105 pipettes the specimen from the specimen container 110 to the reaction cell 112 (reaction container) at the specimen pipetting position 121. The conveyance line 101 is further connected to a rotor 102. By rotating the rotor 102, the specimen rack 111 is exchanged with another conveyance line 101.

The reagent disk 103 holds a reagent bottle 113 containing a reagent and rotationally transfers the reagent bottle 113 to a position where the pipetting device 105 can perform a pipetting operation. The pipetting device 105 pipettes a reagent from the reagent bottle 113 to the reaction cell 112 at a reagent pipetting position 122. The reagent is pipetted into the reaction cell 112 in an amount necessary for colorimetric analysis and reacts with component in a specimen to be analyzed.

The reaction disk 104 holds the reaction cell 112 and rotationally transfers the reaction cell 112, which is a target of each operation, to operation positions indicating positions where the spectrometer 107 that performs colorimetric analysis, the mixing device 106, the reaction cell washing device 108, and the like respectively operate. The reaction cell 112 is kept warm by a constant temperature medium such as water. As a result, in the reaction liquid that is a mixture of the specimen and the reagent, the chemical reaction between the component in the specimen and the reagent is promoted.

The pipetting device 105 sucks a specimen to be subjected to colorimetric analysis from the specimen container 110 and discharges the specimen to the reaction cell 112. The pipetting device 105 sucks a reagent corresponding to an analysis target from the reagent bottle 113 and discharges the reagent to the reaction cell 112. The pipetting device 105 includes an arm 118, a nozzle 116, and a pipetting device motor 119. The arm 118 holds the nozzle 116 and the liquid level sensor 117. The nozzle 116 is connected to a liquid level sensor 117. The liquid level sensor 117 detects the presence or absence of liquid by a capacitance change. A shield portion 114 is installed near the position where the pipetting device 105 performs a pipetting operation. The pipetting device motor 119 moves the pipetting device 105 in the vertical direction or the rotational direction.

The mixing device 106 mixes the reaction liquid in the reaction cell 112 in order to promote the reaction between the component to be analyzed in the specimen discharged from the specimen container 110 to the reaction cell 112 and the reagent discharged from the reagent bottle 113 to the reaction cell 112.

An LED unit 120 irradiates the reaction liquid mixed and chemically reacted by the mixing device 106 with light. The spectrometer 107 disperses the transmitted light that has passed through the reaction liquid. Colorimetric analysis by absorbance measurement is performed based on the dispersed transmitted light.

The reaction cell washing device 108 sucks the reaction liquid from the reaction cell 112 for which the colorimetric analysis has been completed, discharges detergent or the like, and washes the reaction cell 112.

The nozzle washing device 109 washes the tip of the nozzle 116 of the pipetting device 105 into which the specimen or the reagent has been pipetted. As a result, the residue adhering to the nozzle 116 is removed, and the next analysis target is not affected. The control unit 115 includes a processor, a memory, and the like and controls each device and the like.

The input unit 123 includes a keyboard, a mouse, a touch panel, and the like and inputs an instruction from the user to the control unit 115. The display unit 124 includes a liquid crystal display (LCD) or the like and displays an operation screen or the like.

<Configuration of LED Unit>

A peripheral structure of the LED unit 120 according to the present embodiment will be described with reference to FIG. 2. FIG. 2 is a sectional view for explaining the configuration of the LED unit 120 according to the embodiment.

The LED unit 120 has a structure in which a member such as a substrate 402 is accommodated in a holder 401. The light emitted from the LED unit 120 is output from an optical path 404. Thus, the optical path 404 has an opening at least on the optical axis (i.e. at a position along the arrow next to reference numeral 404 in FIG. 2).

An LED 405 is mounted on the substrate 402. A spacer 406 is a member that supports the substrate 402 and is in mechanical contact with the holder 401. By adjusting the position of the spacer 406, the optical axis of the LED 405 can be aligned with the opening of the optical path 404 and the optical axis of an optical component 407. That is, the spacer 406 serves as a member that supports the substrate 402 and aligns the optical axis.

The light emitted from the LED 405 is multiplexed by a multiplexing device 408 and emitted toward the optical path 404 via the optical component 407 (for example, a lens or a slit). This light is output from the opening of the optical path 404 via the optical component 407 (for example, a lens or a slit).

A water channel 411 for circulating constant temperature water for adjusting the temperature of the LED unit 120 is formed inside the wall of the holder 401. This constant temperature water enters from an inlet 409 and exits from an outlet 410. The temperature of the constant temperature water is set to, for example, a temperature higher than the outside air temperature of the LED unit 120. In this case, if the temperature is desired to be lowered, the amount of heat to be propagated is reduced by reducing the amount of water, and the temperature is naturally lowered. Therefore, it is not necessary to separately provide an element or the like capable of cooling operation, and there is an advantage that the temperature can be adjusted with a simple configuration. In addition, the constant temperature liquid may be, for example, a constant temperature liquid used in a constant temperature bath provided for the biochemical analysis device to keep the temperature of the sample constant. In this case, by supplying the constant temperature liquid to the LED unit 120, the LED unit 120 need not include its own constant temperature liquid supply source, which is useful. In this case, the inlet 409 and the outlet 410 are connected to the constant temperature bath. When the constant temperature liquid is shared with the automatic analysis device in this manner, control of the flow rate of constant temperature liquid and the like may be entrusted to the automatic analysis device. Alternatively, for example, the LED unit 120 itself may have a flow rate control function by arranging a flow rate regulating valve or the like inside the LED unit 120. A device such as a controller that gives a control instruction may be incorporated inside the LED unit 120 or may be configured as a device outside the LED unit 120.

The optical path 404 has an opening through which light emitted from the LED 405 passes. This opening allows air to enter and exit between the internal space of the LED unit 120 and the outside air. Such entrance and exit of air becomes a factor that fluctuates the temperature of the internal space of the LED unit 120, and thus is desirably suppressed as much as possible. That is, it can be said that it is desirable to keep the opening size of the optical path 404 to the minimum necessary for emitting light.

In addition to the opening of the optical path 404, a hole capable of ventilating between the internal space of the LED unit 120 and the outside air may be provided. For example, a hole through which wiring for supplying power to the LED 405 passes may be provided in a part of the spacer 406. Even in this case, the opening size of the hole is desirably smaller than the opening size of the optical path 404. That is, it is desirable that the ventilation capacity of the internal space of the LED unit 120 is maximized by the opening size of the optical path 404. As a result, the heat exchange between the internal space and the outside air is suppressed to the minimum, so that the temperature fluctuation of the LED 405 can be suppressed. Even in a case where a ventilable hole is provided other than the opening of the optical path 404, if the hole can be sealed with an appropriate sealing material or the like, it is desirable to seal the hole.

<LED Operation>

When the power is applied to the LED unit 120, the LED 405 emits light, and the temperature of the LED 405 and its peripheral members gradually rises with the lapse of time. When the temperature reaches a certain level, the temperature is stabilized.

The light amount and the wavelength of the LED 405 have temperature characteristics and fluctuate depending on the temperature. Therefore, in order to quickly stabilize the characteristics of the emitted light, it is necessary to quickly raise the temperatures of the LED and its peripheral members, particularly the spacer 406 and the substrate 402. For this purpose, it is necessary to reduce the volume of the spacer 406 as much as possible to reduce the heat capacity as much as possible and to configure the substrate 402 and the spacer 406 with a material (for example, aluminum) such as a metal having high heat conductivity.

<Heat Dissipation of LED>

Figure 3:
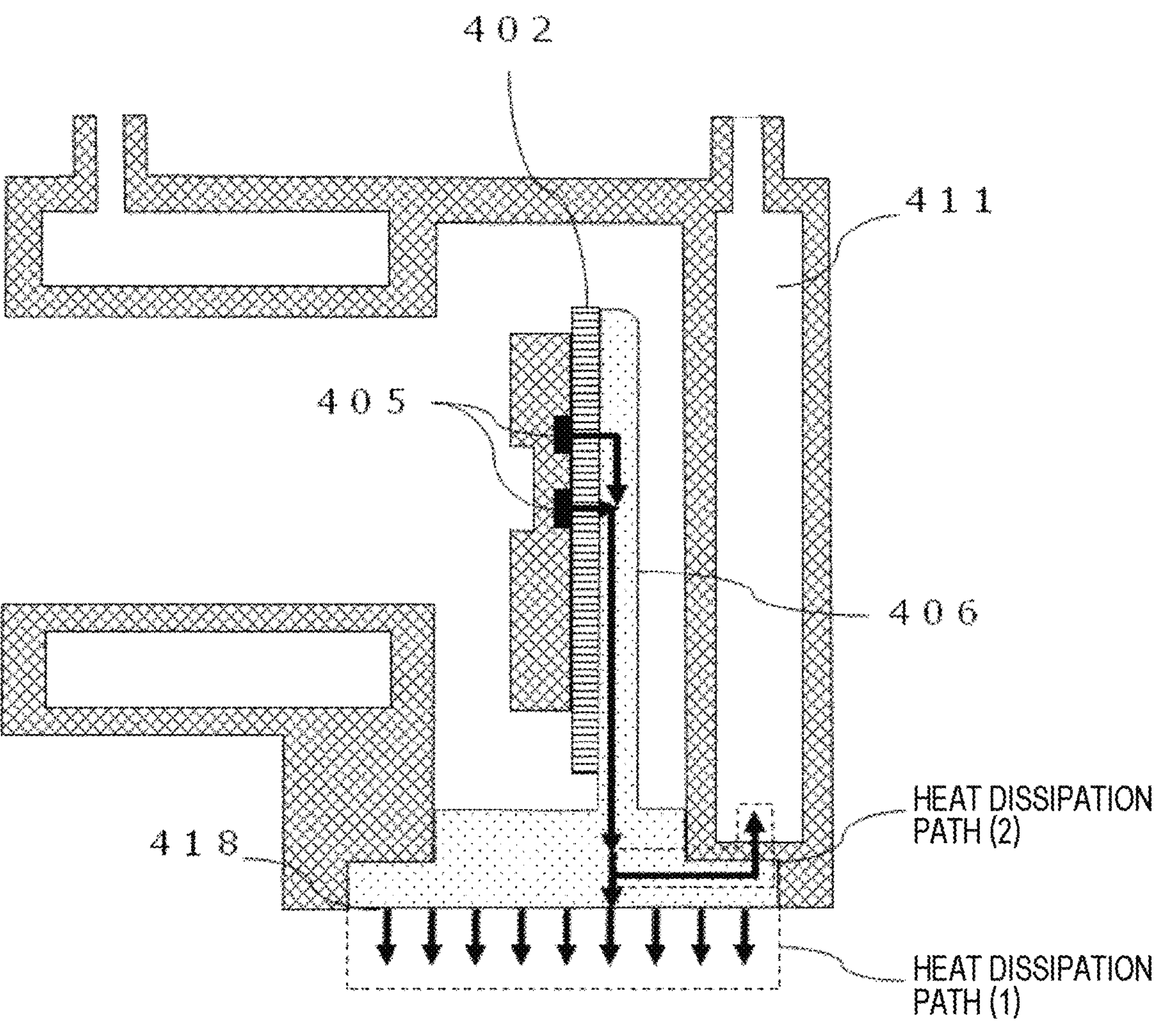
FIG. 3 is a sectional view of a holder and a spacer for explaining a heat dissipation path according to a first embodiment.

Next, a heat dissipation path when the LED is turned on will be described with reference to FIG. 3. As illustrated in FIG. 3, the heat generated when a current flows through the LED 405 is transferred from the LED 405 to the substrate 402 and from the substrate 402 to the spacer 406. There are two subsequent heat transfer paths, the first being a heat dissipation path from a surface 418 of the spacer which is exposed to the outside air to the outside air (heat dissipation path (1) in FIG. 3), and the second being a heat dissipation path from the spacer 406 to the holder 401 and from the holder 401 to the constant temperature water in the water channel 411 (heat dissipation path (2) in FIG. 3).

<Problem of Heat Dissipation Path (1)>

Hereinafter, the heat dissipation path (1) will be described. In the heat dissipation path (1), heat is dissipated from the surface 418 of the spacer which is exposed to the outside air to the outside air. The airflow of the outside air may fluctuate due to disturbance. Due to the fluctuation in the airflow, the amount of heat dissipated from the surface 418 of the spacer which is exposed to the outside air to the outside air fluctuates, the temperature of the spacer 406 fluctuates. Furthermore, the temperatures of the substrate 402 and the LED 405 fluctuate. Finally, the luminance efficiency of the LED 405 fluctuates. In order to prevent the occurrence of the temperature fluctuation of the LED even in the case of such disturbance, it is effective that the spacer 406 and the holder 401 are formed of a member having a large heat capacity or a small heat conductivity.

On the other hand, as described above, in order to quickly raise the temperature of the LED 405 to a stable state, the spacer 406 needs to be formed of a member having a small heat capacity and a large heat conductivity. That is, the measure for the heat capacity and the heat conductivity of the spacer 406 and the holder 401 to reduce the temperature fluctuation of the LED even when there is a disturbance is opposite to the measure for rapidly increasing the temperature of the LED to the stable state.

Therefore, in order to achieve both the requirement to reduce the temperature fluctuation of the LED and the requirement to quickly raise the temperature of the LED to the stable state even when there is a disturbance, in the present embodiment, (a) the thermal resistance of convective heat transfer is increased, and (b) the thermal resistance of heat conduction is adjusted, with the spacer 406 being a member having a large heat conductivity. Hereinafter, (a) and (b) will be described in detail.

<(a) Increase in Thermal Resistance of Convective Heat Transfer>

Figure 4:
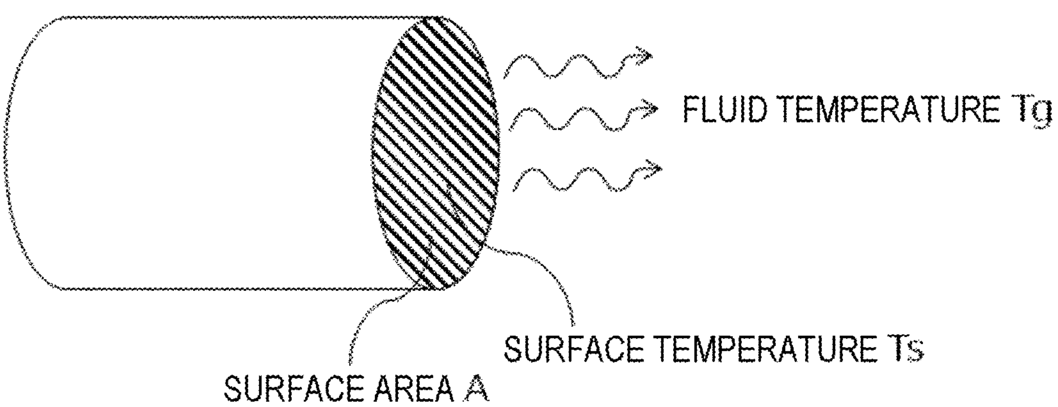
FIG. 4 is a schematic view for explaining convective heat transfer of a cylindrical object.

First, (a) increasing the thermal resistance of convective heat transfer will be described. FIG. 4 is a schematic diagram of convective heat transfer in cylindrical object. In convective heat transfer, the relationship among a surface temperature Ts, a fluid temperature Tg, a heat flow rate Qt, and a thermal resistance Rt is expressed by (Equation 1).

$$(Ts - Tg) = Rt \times Qt \quad \text{(Equation 1)}$$

Here, the thermal resistance Rt is expressed by (Equation 2) from the convective heat transfer coefficient hm and a contact area Aout with the outside air.

$$Rt = 1/(hm \times Aout) \quad \text{(Equation 2)}$$

In order to increase the thermal resistance Rt, it is found from (Equation 2) that the contact area Aout with the outside air may be reduced.

Figure 5A:
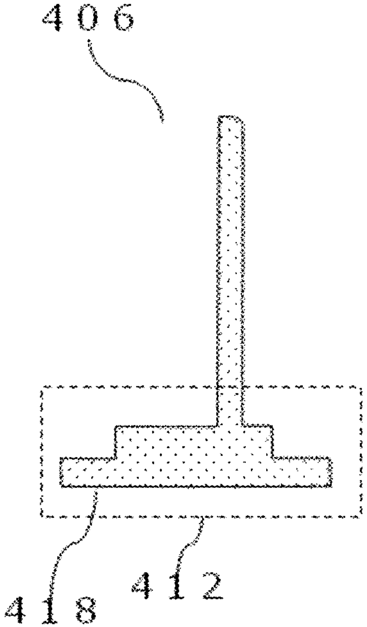
FIG. 5A is a sectional view for explaining the configuration of a spacer according to the first embodiment.
Figure 5B:
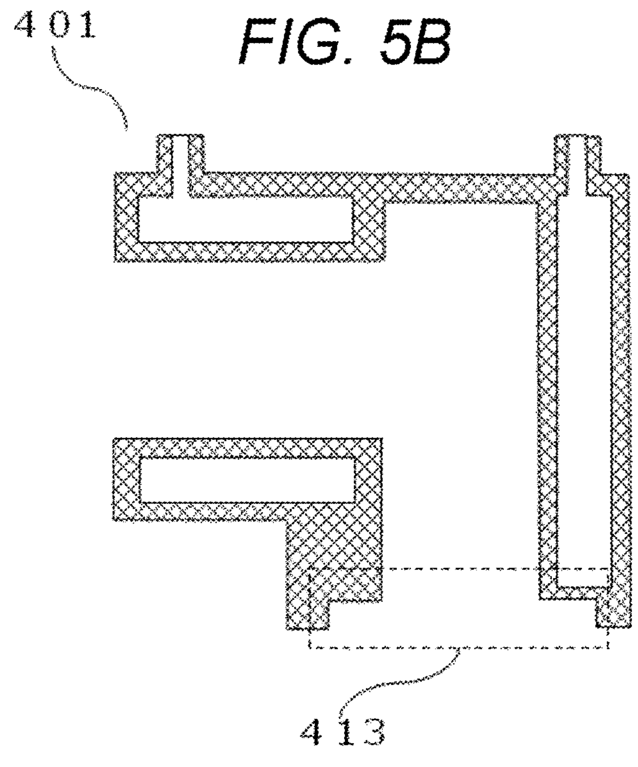
FIG. 5B is a sectional view for explaining the configuration of the holder according to the first embodiment.
Figure 5C:
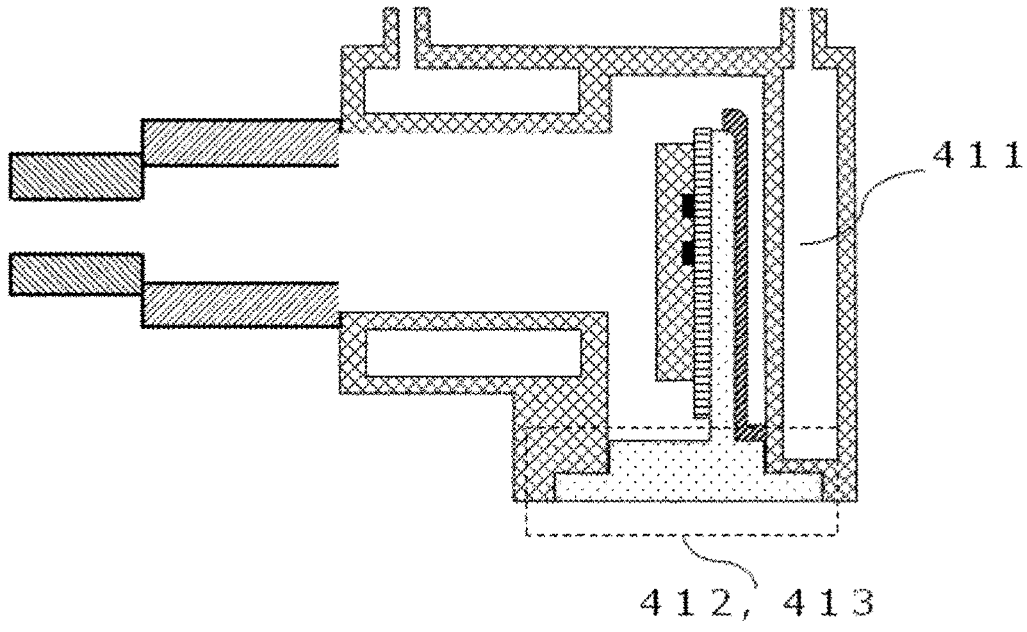
FIG. 5C is a sectional view for explaining the configuration of the spacer and a sub-base according to the first embodiment.

Here, in the present invention, in order to reduce the contact area Aout with the outside air, the spacer 406 forms a convex portion 412 as illustrated in FIG. 5A, and the holder 401 forms a concave portion 413 as illustrated in FIG. 5B. Further, as illustrated in FIG. 5C, the outer periphery of the spacer convex portion 412 is covered with the holder concave portion 413. With such a configuration, it is possible to reduce the contact area of the spacer 406 with the outside air and to increase the thermal resistance of convective heat transfer. As a result, even when there is a disturbance, the temperature fluctuation of the spacer 406 can be reduced, and furthermore, the temperature fluctuation of the substrate 402 and the LED 405 can also be reduced. As a result, it is possible to achieve both the requirement to rapidly increase the temperature of the LED 405 and the requirement to reduce the temperature fluctuation even when there is a disturbance.

Further, by forming the water channel 411 in the holder concave portion 413, the water channel 411 can be brought close to the spacer convex portion 412 (shown in FIG. 5C). As a result, the contribution of the heat dissipation path (2) (heat dissipation from the spacer 406 to the holder 401 and from the holder 401 to the constant temperature water in the water channel 411) becomes larger than that of the heat dissipation path (1) (heat dissipation from the surface 418 of the spacer which is exposed to the outside air to the outside air), and the temperature fluctuation can be reduced even in a case where there is disturbance.

<(b) Adjustment of Thermal Resistance of Heat Conduction>

Figure 6:
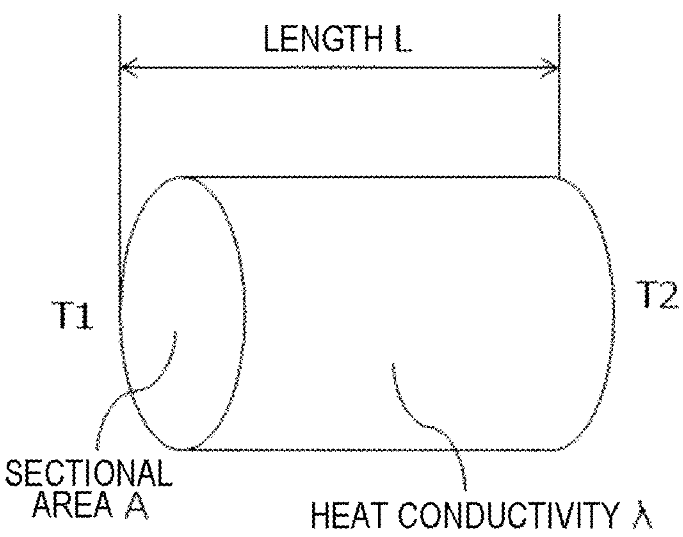
FIG. 6 is a schematic diagram for explaining the heat conduction of a cylindrical object.

Next, (b) adjustment of thermal resistance of heat conduction will be described. FIG. 6 is a schematic diagram of the heat conduction of a cylindrical object. In heat conduction, the relationship among a temperature difference (T1−T2), a heat flow rate Pc, and a thermal resistance Rc is expressed by (Equation 3).

$$(T1 - T2) = Rc \times Pc \quad \text{(Equation 3)}$$

Here, the thermal resistance Rc is expressed by (Equation 4) from the length L, the heat conductivity λ, and the sectional area A.

$$Rc = L/(\lambda A) \quad \text{(Equation 4)}$$

In order to increase the thermal resistance Rc, it is found from (Equation 4) that the length L may be increased, or the heat conductivity λ or the sectional area A may be decreased.

Here, with reference to FIGS. 7, 8, 9A, and 9B, thermal resistance related to the heat conduction of the spacer 406 according to the present embodiment will be described.

Figure 7:
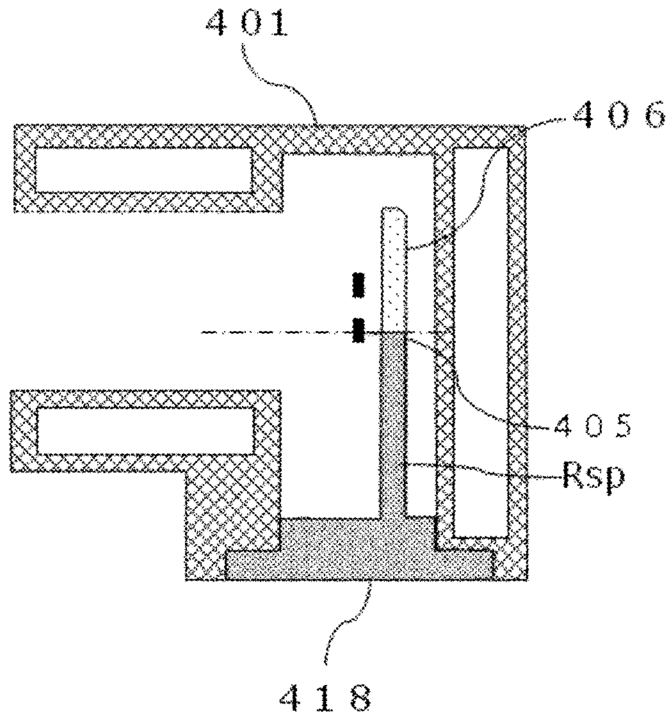
FIG. 7 is a sectional view for explaining thermal resistance related to the heat conduction of the spacer according to the first embodiment.

FIG. 7 is a sectional view of the holder 401 and the spacer 406 for explaining thermal resistance related to the heat conduction of the spacer in the present embodiment. As illustrated in FIG. 7, a thermal resistance Rsp related to heat conduction in the present embodiment is from the LED 405 to the surface 418 of the spacer which is exposed to the outside air (the gray area in FIG. 7).

Figure 8:
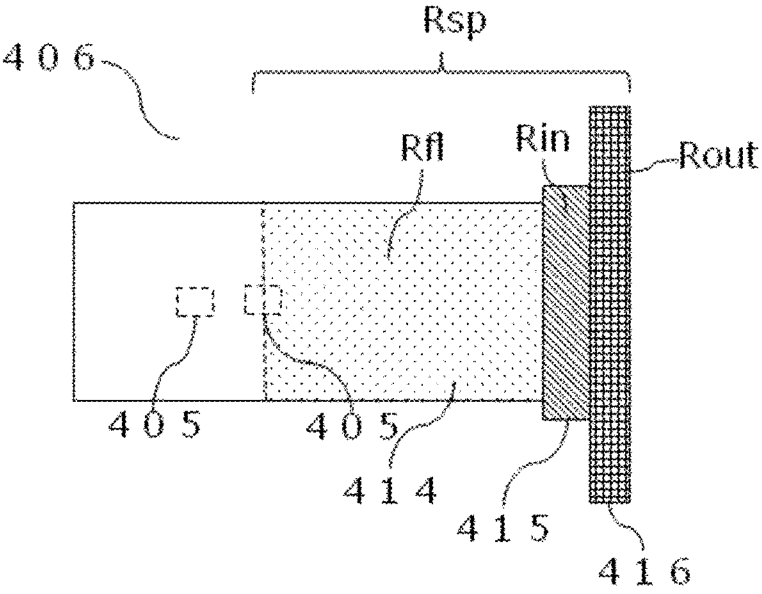
FIG. 8 is a diagram for explaining a breakdown of thermal resistance related to the heat conduction of the spacer according to the first embodiment.

As illustrated in FIG. 8, the thermal resistance Rsp is divided into a thermal resistance Rfl (the dot portion in FIG. 8) from the LED 405 to an inner cylindrical portion 415 in a flat plate portion 414, a thermal resistance Rin (the hatched portion in FIG. 8) of the inner cylindrical portion 415, and a thermal resistance Rout (the grid portion in FIG. 8) of an outer cylindrical portion 416 and is calculated from (Equation 5).

$$Rsp = Rfl + Rin + Rout \quad \text{(Equation 5)}$$

Here, the flat plate portion 414 is a portion that supports the substrate 402 on which the LED 405 is mounted. The inner cylindrical portion 415 is a portion for positioning the spacer 406 with respect to the holder 401 by being fitted into a cylindrical portion of the holder 401 to align the optical axis. Further, the outer cylindrical portion 416 is a portion that comes into contact with the holder 401 and transfers heat between the spacer 406 and the holder 401.

Figure 9A:
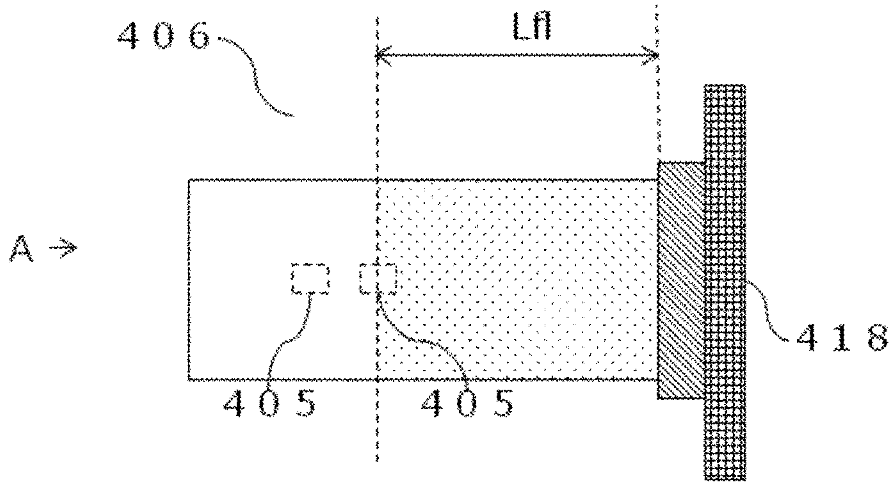
FIG. 9A is a side view for explaining thermal resistance related to the heat conduction of the flat plate portion of the spacer according to the first embodiment.
Figure 9B:
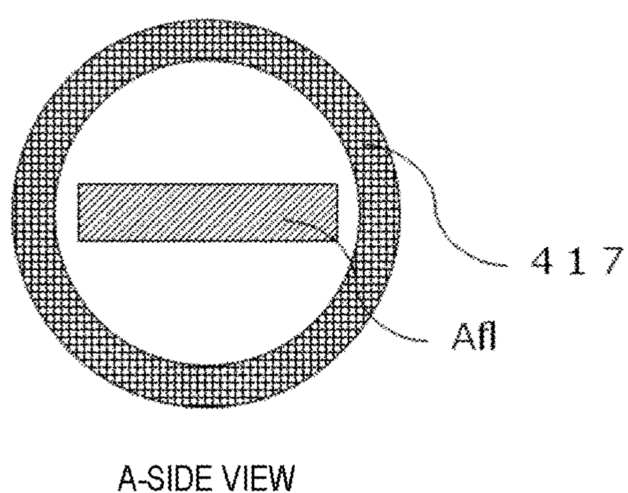
FIG. 9B is a sectional view for explaining thermal resistance related to the heat conduction of the flat plate portion of the spacer according to the first embodiment.

The thermal resistance Rfl will be described below with reference to FIGS. 9A and 9B. Assuming that the length from the LED 405 to the inner cylindrical portion 415 in the flat plate portion 414 is Lfl (FIG. 9A), the sectional area of the flat plate portion 414 is Afl (the hatched area in FIG. 9B), and the heat conductivity of the flat plate portion 414 is kfl, the thermal resistance Rfl is expressed by (Equation 4) to (Equation 6).

$$Rfl = Lfl/(Afl \times kfl) \quad \text{(Equation 6)}$$

Figure 10A:
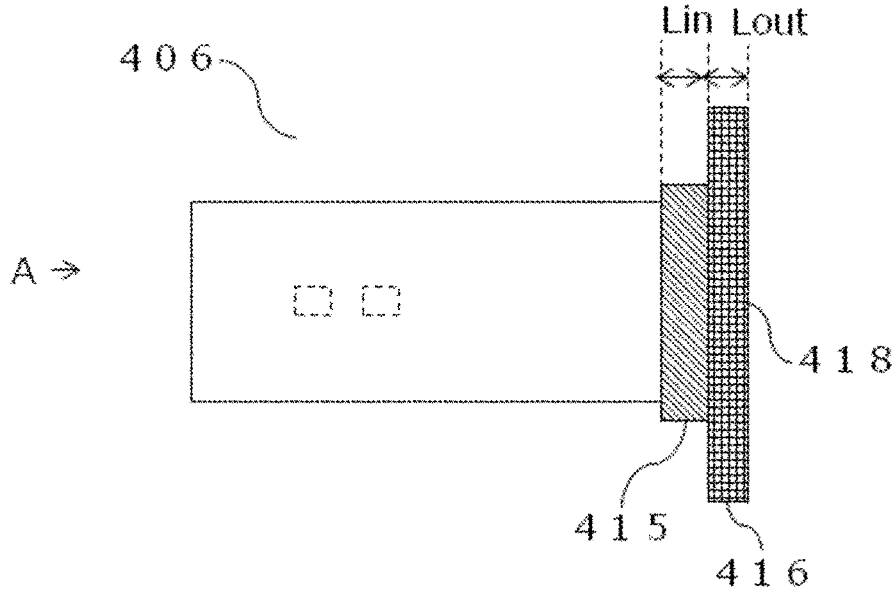
FIG. 10A is a side view for explaining thermal resistance related to the heat conduction of the inner cylindrical portion and the outer cylindrical portion of the spacer according to the first embodiment.
Figure 10B:
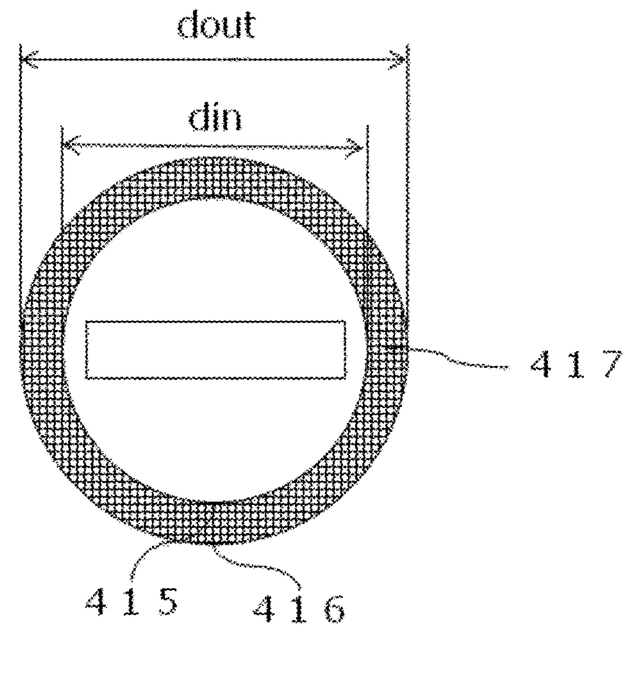
FIG. 10B is a sectional view for explaining thermal resistance related to the heat conduction of the inner cylindrical portion and the outer cylindrical portion of the spacer according to the first embodiment.

Similarly, the thermal resistance Rin of the inner cylindrical portion 415 and the thermal resistance Rout of the outer cylindrical portion 416 will be described with reference to FIGS. 10A and 10B. When the length of the inner cylindrical portion 415 is represented by Lin, the length of the outer cylindrical portion 416 is represented by Lout (both shown in FIG. 10A), the diameter of the inner cylindrical portion 415 is represented by din, the diameter of the outer cylindrical portion 416 is represented by dout (both shown in FIG. 10B), the heat conductivity of the inner cylindrical portion 415 is represented by kin, and the heat conductivity of the outer cylindrical portion 416 is represented by kout, the thermal resistances Rin and Rout are expressed by (Equation 7) and (Equation 8), respectively.

$$Rin = Lin/[(din/2)^2 \times \pi \times kin] \quad \text{(Equation 7)}$$

$$Rout = Lout/[\{(dout/2)^2 - (din/2)^2\} \times \pi \times kout] \quad \text{(Equation 8)}$$

By using (Equation 5) to (Equation 8) given above, the thermal resistance Rsp from the LED 405 to the surface 418 of the spacer which is exposed to the outside air is obtained.

Here, as indicated by (Equation 6), (Equation 7), and (Equation 8), in order to increase the thermal resistances Rfl, Rin, and Rout, the lengths Lfl, Lin, and Lout may be increased, or the sectional area Afl, the diameters din and dout, and the heat conductivities kfl, kin, and kout may be decreased.

Specifically, the thermal resistance Rsp is preferably 2 (K/W) or more and 40 (K/W) or less in order to achieve both the requirement to reduce the temperature fluctuation of the LED even when there is a disturbance and the requirement to rapidly raise the temperature of the LED to the stable state.

In addition, the spacer 406 may be formed of two or more kinds of materials, and the heat conductivity of any one of kfl, kin, and kout may be reduced to increase the thermal resistance Rsp.

Further, only the heat conductivity kout of the outer cylindrical portion 416 having the surface 418 of the spacer which is exposed to the outside air may be reduced to suppress the heat dissipation to the outside air, or the outer cylindrical portion 416 may be formed of two or more kinds of materials to reduce the heat conductivity of the portion having the surface 418 of the spacer which is exposed to the outside air. Examples of a material having a low heat conductivity include brass, bronze, stainless steel, and PEEK. By forming a film on the surface 418 of the spacer which is exposed to the outside air, the heat conductivity of only the surface 418 of the spacer which is exposed to the outside air may be reduced to suppress heat dissipation to the outside air.

Effects

Figure 11A:
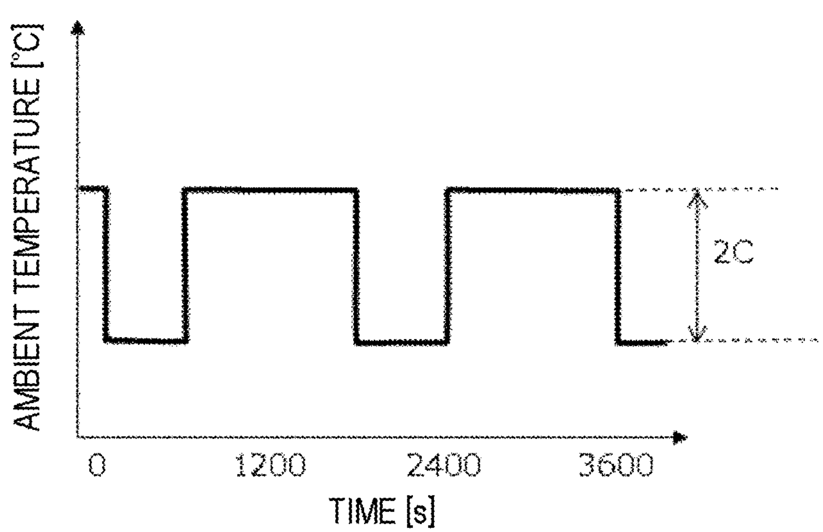
FIG. 11A is a graph showing fluctuations in ambient temperature according to the first embodiment.
Figure 11B:
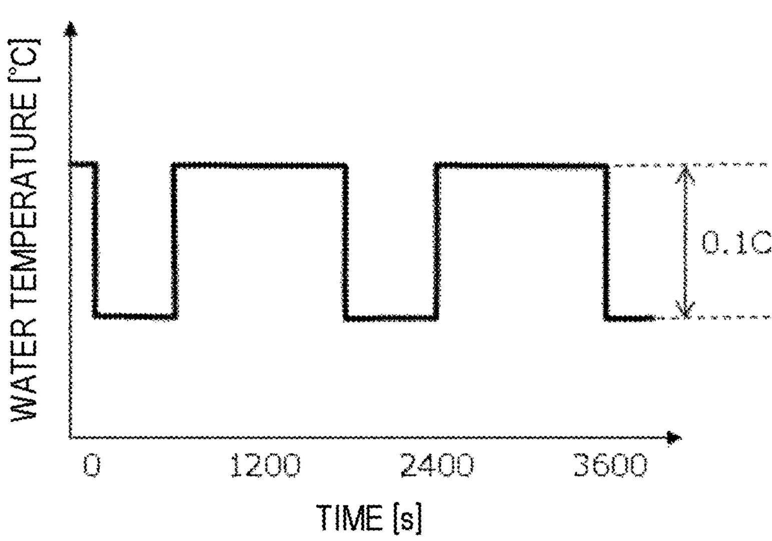
FIG. 11B is a graph showing fluctuations in constant temperature water temperature according to the first embodiment.
Figure 12:
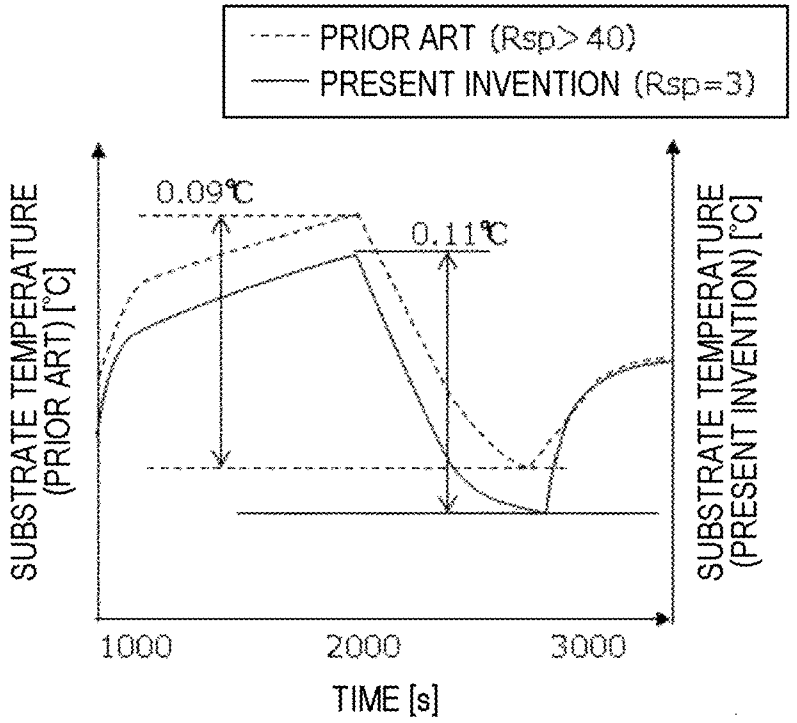
FIG. 12 is a graph illustrating substrate temperatures when constant temperature water having the ambient temperature and constant temperature water having the water temperature illustrated in FIGS. 11A and 11B are injected into holders.
Figure 13:
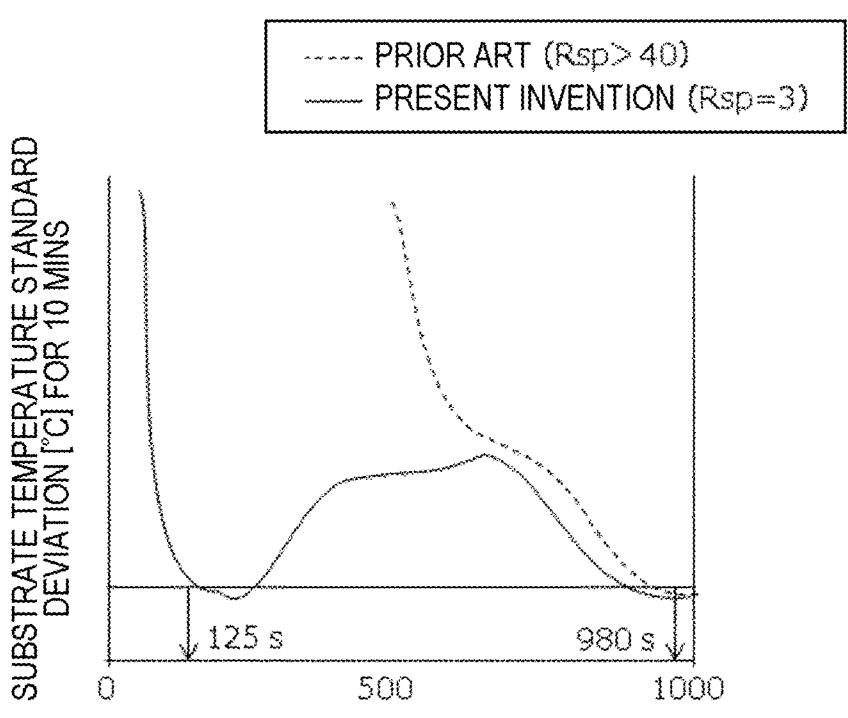
FIG. 13 is a diagram illustrating standard deviations of substrate temperatures for 10 minutes when constant temperature water having the ambient temperature and constant temperature water having the water temperature illustrated in FIGS. 11A and 11B are injected into the holders.

Effects of the present embodiment will be described with reference to FIGS. 11A, 11B, 12, and 13. FIGS. 11A and 11B are graphs illustrating temporal changes in the ambient temperature of the LED unit and the water temperature, FIG. 12 is a graph illustrating temporal changes in the LED substrate temperature, and FIG. 13 is a graph illustrating the standard deviation of the LED substrate temperature for 10 minutes, respectively. The 10-minute standard deviation of the LED substrate temperature, which is an index illustrated in FIG. 13, is an index for determining whether the LED substrate temperature has rapidly increased after the power of the LED is turned on. It is known that the standard deviation of the LED substrate temperature for 10 minutes decreases with time after the LED power is turned on, and when the standard deviation decreases to about 0.01° C., the light amount and the wavelength of the LED are also stabilized.

The ambient temperature is assumed to fluctuate by 2° C. as shown in FIG. 11A, and the water temperature is assumed to fluctuate by about 0.1° C. as shown in FIG. 11B. In the conventional configuration in which the thermal resistance Rsp is 40 or more so as to reduce the influence of the LED substrate temperature under the temperature environment illustrated in FIGS. 11A and 11B, the LED substrate temperature can be suppressed to a fluctuation of about 0.09° C. as illustrated in FIG. 12, but the time required for the standard deviation of the LED substrate temperature for 10 minutes to be 0.01° C. or less becomes about 980 seconds as illustrated in FIG. 13.

On the other hand, in the present invention in which the thermal resistance Rsp is about 3, the fluctuation in the LED substrate temperature can be suppressed to about 0.11° C. as shown in FIG. 12, and the time required for the standard deviation of the LED substrate temperature for 10 minutes to be 0.01° C. or less can be set to about 125 seconds as shown in FIG. 13.

REFERENCE SIGNS LIST

100 biochemical analysis device
101 conveyance line
102 rotor
103 reagent disk
104 reaction disk
105 pipetting device
106 mixing device
107 spectrometer
108 reaction cell washing device
109 nozzle washing device
110 specimen container
111 specimen rack
112 reaction cell
113 reagent bottle
114 shield portion
115 control unit
116 nozzle
117 liquid level sensor
118 arm
119 pipetting device motor
120 LED unit
121 specimen pipetting position
122 reagent pipetting position
123 input unit
124 display unit
201 input/storage unit
202 ISE unit
203 specimen conveyance unit
204 colorimetric analysis unit
303 reaction tank
304 diffraction grating
305 photodetector
306 absorbance calculator
307 current detection unit
308 current adjustment unit
401 holder
402 substrate
404 optical path
405 LED
406 spacer
407 optical component
408 multiplexing device
409 inlet
410 outlet
411 water channel
412 spacer convex portion
413 holder concave portion
414 flat plate portion
415 inner cylindrical portion
416 outer cylindrical portion

417 contact surface

418 surface of spacer which is exposed to outside air

The invention claimed is:

1. A biochemical analysis device that emits light used to measure absorbance of a sample, the biochemical analysis device comprising:

an LED that emits the light;

a substrate on which the LED is mounted;

a spacer that supports the substrate;

a holder that accommodates the LED, the substrate, and the spacer; and a flow path formed by circulating constant temperature water through the holder, wherein the spacer is formed of a material having a heat conductivity higher than that of the holder, the spacer is in contact with the holder at a contact portion, a convex portion of the spacer is covered with a concave portion of the holder through an air layer, and when a thermal resistance from an LED installation portion of the spacer to a contact portion of the spacer with the outside air is Rsp, a relationship of 2 (K/W)≤Rsp≤40 (K/W) is satisfied.

2. The biochemical analysis device according to claim 1, wherein the spacer is formed of not less than two materials.

3. The biochemical analysis device according to claim 1, wherein a material of the spacer is different between a contact portion with outside air and other portions, and a heat conductivity of a material of the contact portion with the outside air is smaller than a heat conductivity of other portions.

4. The biochemical analysis device according to claim 1, wherein a flow path is disposed in the concave portion of the holder.

5. The biochemical analysis device according to claim 1, wherein the holder has an internal temperature higher than an outside air temperature.

6. The biochemical analysis device according to claim 1, wherein a flow rate of constant temperature water flowing through a water channel is reduced, so that a temperature inside the holder is lowered.

7. A biochemical analysis device that emits light used to measure absorbance of a sample, the biochemical analysis device comprising:

an LED that emits the light;

a substrate on which the LED is mounted;

a spacer that supports the substrate;

a holder that accommodates the LED, the substrate, and the spacer; and a flow path formed by circulating constant temperature water through the holder, wherein the spacer is formed of a material having a heat conductivity higher than that of the holder, the spacer is in contact with the holder at a contact portion, a convex portion of the spacer is covered with a concave portion of the holder through an air layer, and a film is formed at a contact portion of the spacer with outside air.

8. The biochemical analysis device according to claim 7, wherein the heat conductivity of the film is smaller than the heat conductivity of the spacer.

9. The biochemical analysis device according to claim 7, wherein a flow path is disposed in the concave portion of the holder.

10. The biochemical analysis device according to claim 7, wherein the holder has an internal temperature higher than an outside air temperature.

11. The biochemical analysis device according to claim 7, wherein a flow rate of constant temperature water flowing through a water channel is reduced, so that a temperature inside the holder is lowered.

12. An LED light source device that emits light used to measure absorbance of a sample, the LED light source device comprising:

an LED that emits the light;

a substrate on which the LED is mounted;

a spacer that supports the substrate; and a holder that accommodates the LED, the substrate, and the spacer, wherein the spacer is formed of a material having a heat conductivity higher than that of the holder, the spacer is in contact with the holder at a contact portion, a convex portion of the spacer is covered with a concave portion of the holder through an air layer, and when a thermal resistance from an LED installation portion of the spacer to a contact portion of the spacer with the outside air is Rsp, a relationship of 2 (K/W)≤Rsp≤40 (K/W) is satisfied.

13. The LED light source device according to claim 12, wherein the spacer is formed of not less than two materials.

14. The LED light source device according to claim 12, wherein a material of the spacer is different between a contact portion with outside air and other portions, and a heat conductivity of a material of the contact portion with the outside air is smaller than a heat conductivity of other portions.

15. An LED light source device that emits light used to measure absorbance of a sample, the LED light source device comprising:

an LED that emits the light;

a substrate on which the LED is mounted;

a spacer that supports the substrate; and a holder that accommodates the LED, the substrate, and the spacer, wherein the spacer is formed of a material having a heat conductivity higher than that of the holder, the spacer is in contact with the holder at a contact portion, a convex portion of the spacer is covered with a concave portion of the holder through an air layer, and a film is formed at a contact portion of the spacer with outside air.

16. The LED light source device according to claim 15, wherein the heat conductivity of the film is smaller than the heat conductivity of the spacer.

* * * * *